US012689872B2

(12) United States Patent
Hossain et al.

(10) Patent No.: US 12,689,872 B2
(45) Date of Patent: Jul. 21, 2026

(54) ELECTRONIC DEVICE AND CONTROLLING METHOD OF ELECTRONIC DEVICE

(71) Applicant: Samsung Electronics Co., Ltd., Suwon-si (KR)

(72) Inventors: Md. Imtiaz Hossain, Dacca (BD); Md. Zahid Hasan Polin, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 18/324,675

(22) Filed: May 26, 2023

(65) Prior Publication Data

US 2023/0300574 A1 Sep. 21, 2023

Related U.S. Application Data

(63) Continuation of application No. PCT/KR2023/001167, filed on Jan. 26, 2023.

(30) Foreign Application Priority Data

Jan. 27, 2022 (KR) ........................ 10-2022-0012644

(51) Int. Cl.
H04W 4/10 (2009.01)

(52) U.S. Cl.
CPC ..................................... H04W 4/10 (2013.01)

(58) Field of Classification Search
CPC ........... H04W 4/10; H04W 4/16; H04W 4/20; H04W 4/90; H04W 76/45; H04W 4/02; H04W 88/02; H04W 4/023
See application file for complete search history.

(56) References Cited

U.S. PATENT DOCUMENTS

| | | | |
|---|---|---|---|
| 8,102,841 B2 | 1/2012 | Elumalai et al. | |
| 8,402,122 B2 | 3/2013 | Cho et al. | |
| 8,649,802 B2 | 2/2014 | Jeon et al. | |
| 10,051,128 B2 * | 8/2018 | Peterson | H04W 4/023 |

(Continued)

FOREIGN PATENT DOCUMENTS

| | | |
|---|---|---|
| CA | 2 971 134 A1 | 8/2016 |
| JP | 4707552 B2 | 6/2011 |

(Continued)

OTHER PUBLICATIONS

International Search Report dated Apr. 5, 2023, issued in International Application No. PCT/KR2023/001167.

(Continued)

*Primary Examiner* — Fayyaz Alam
(74) *Attorney, Agent, or Firm* — Jefferson IP Law, LLP

(57) ABSTRACT

An electronic device and a controlling method of the electronic device are provided. The method includes receiving a call request of a caller from a server, identifying whether a recipient who is a user of the electronic device is in a call with another caller, identifying a first external device close to the electronic device among one or more external devices connected to the electronic device in case that it is identified that the recipient is in the call with the other caller, and transmitting identification information for the identified first external device and a response to the call request to the server to transmit the call request to the identified first external device.

20 Claims, 7 Drawing Sheets

<u>100</u>

130

(56)                     References Cited

U.S. PATENT DOCUMENTS

| | | | |
|---|---|---|---|
| 10,581,937 | B2 | 3/2020 | Troester et al. |
| 2007/0032225 | A1* | 2/2007 | Konicek ................. G08B 13/00 |
| | | | 455/417 |
| 2008/0032689 | A1* | 2/2008 | Kubota ................... H04L 12/66 |
| | | | 455/425 |
| 2008/0130848 | A1* | 6/2008 | Elumalai ............ H04L 65/1073 |
| | | | 379/110.01 |
| 2016/0072955 | A1* | 3/2016 | Barkan ................. H04M 3/543 |
| | | | 455/417 |
| 2021/0045185 | A1 | 2/2021 | Nanjundappa et al. |
| 2025/0220742 | A1* | 7/2025 | Chhabra .............. H04W 76/14 |

FOREIGN PATENT DOCUMENTS

| | | |
|---|---|---|
| JP | 6485258 B2 | 3/2019 |
| KR | 10-0703272 B1 | 4/2007 |
| KR | 10-2012-0017555 A | 2/2012 |
| KR | 10-1411106 B1 | 6/2014 |
| KR | 10-1478621 B1 | 1/2015 |
| KR | 10-1510730 B1 | 4/2015 |
| KR | 10-2017-0078426 A | 7/2017 |
| KR | 10-2021-0026494 A | 3/2021 |
| KR | 10-2305625 B1 | 9/2021 |
| KR | 10-2347662 B1 | 1/2022 |

OTHER PUBLICATIONS

Korean Office Action dated May 19, 2026, issued in Korean Application No. 10-2022-0012644.

* cited by examiner

<u>100</u>

ELECTRONIC DEVICE AND CONTROLLING METHOD OF ELECTRONIC DEVICE

CROSS-REFERENCE TO RELATED APPLICATION(S)

This application is a continuation application, claiming priority under § 365(c), of an International application No. PCT/KR2023/001167, filed on Jan. 26, 2023, which is based on and claims the benefit of a Korean patent application number 10-2022-0012644, filed on Jan. 27, 2022, in the Korean Intellectual Property Office, the disclosure of which is incorporated by reference herein in its entirety.

TECHNICAL FIELD

The disclosure relates to an electronic device and a controlling method of an electronic device. More particularly, the disclosure relates to an electronic device which may transmit a call request to another external device of a recipient or notify the recipient of the call request, and a controlling method of an electronic device.

BACKGROUND ART

Reliable communication is a very important issue for people. In particular, in a group that aims to quickly and effectively respond to an emergency situation, it may be very important for a member of the group to quickly access information to make a decision based on the information in an urgent situation and a rapidly changed situation. In particular, mission critical push to talk (MCPTT) may be technology that assists in satisfying this important requirement.

The MCPTT refers to the technology that enables emergency communication by using a push to talk (PTT) function such as a walkie-talkie. The MCPTT is the technology developed based on an open mobile alliance (OMA) authentication public safety standard set by a 3rd generation partnership project (3GPP). With the MCPTT technology, a call with all devices included in a predetermined group may be immediately performed in case that a user presses a predefined button as if speaking to the walkie-talkie while using a long-term evolution (LTE) or fifth generation (5G) mobile communication network. In addition to one-to-many, one-to-one or emergency calls are possible, the user may arbitrarily listen to an ambient sound of a specific user terminal remotely positioned, or an operation center may forcefully listen to a call in emergency.

In detail, a call request based on the MCPTT may be a general MCPTT call request, or may be an emergency MCPTT call request for performing a higher-priority MCPTT call.

According to the prior art, in case that the general MCPTT call request is received, an electronic device may identify whether a recipient is in a call with another caller. In case that the recipient is not in the call with another caller, the electronic device may transmit a response to the call request to a server, and as a result, a call may be performed between the caller and the recipient. On the other hand, in case that the recipient is in the call with another caller, the electronic device may compare priority of the current call with priority of the received call request.

In case that the priority of the current call is higher than the priority of the received call request, the electronic device may then ignore the received call request. In case that the priority of the current call is lower than the priority of the received call request, the electronic device may end the current call, and transmit the response to the current request to the server. As a result, the call may be performed between the caller and the recipient.

According to the prior art, in case that the emergency MCPTT call request is received, the electronic device may start a call session according to the received call request, regardless of whether the recipient is in the call with another caller. That is, in case that the recipient is in the call with another caller, the electronic device may end the current call and start the call session according to the received call request.

In case that a message of the caller is received after the call session is started, the electronic device may periodically receive a notification requesting a response from the recipient until there is the response from the recipient to the received message. The electronic device may end the call session in case that there is no response from the recipient within a threshold time after the call session is started.

However, in case that the general MCPTT call request is received, the recipient may be in the call with another caller and the priority of the current call may be higher than the priority of the received call request. Here, the received call request may be ignored, and accordingly, the call may not be performed between the caller and the recipient. Meanwhile, in case that the emergency MCPTT call request is received, the recipient may not be in vicinity of the electronic device. Here, the recipient may not respond to a message of the caller, and accordingly, the call may not be performed between the caller and the recipient.

The above information is presented as background information only to assist with an understanding of the disclosure. No determination has been made, and no assertion is made, as to whether any of the above might be applicable as prior art with regard to the disclosure.

DISCLOSURE

Technical Problem

Aspects of the disclosure are to address at least the above-mentioned problems and/or disadvantages and to provide at least the advantages described below. Accordingly, an aspect of the disclosure is to provide an electronic device which may transmit a call request to another external device of a recipient or notify the recipient of the call request in case that it is difficult for the recipient to respond to the call request of a caller, and a controlling method of an electronic device.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes a communicator, a memory that stores at least one instruction, and a processor that allows the at least one instruction to be executed, wherein the processor identifies whether a recipient who is a user of the electronic device is in a call with another caller by allowing the at least one instruction to be executed in case that a call request of a caller is received from a server through the communicator, identifies a first external device close to the electronic device among one or more external devices connected to the electronic device in case that it is identified that the recipient is in the call with the other caller, and controls the communicator to transmit identification information for the identified first external device and a response to the call request to the server to transmit the call request to the identified first external device.

Here, the processor may identify the first external device close to the electronic device among the one or more external devices based on information on a strength of a signal received from the one or more external devices through the communicator.

Meanwhile, the call request may be a call request for performing a call based on mission critical push to talk (MCPTT) technology, and the first external device may be a device capable of processing the call request based on the MCPTT technology.

Meanwhile, the processor may allow a call session according to the call request to be started in case that the call request is a call request for performing a call based on emergency MCPTT technology, and control the communicator to transmit a notification indicating that the call session is started to one or more external devices among the identified one or more external devices in case that the response of the recipient to the call request is not received for a predetermined threshold time.

Here, the processor may identify a local network to which the electronic device is connected based on a position of the recipient, and identify one or more external devices connected to the identified local network as the one or more external devices.

Here, the position of the recipient may be identified based on at least one of information on a position of the user received through a position information sensor included in the electronic device, information on a strength of a signal received from the external device through the communicator, or pre-stored network position information for the local network.

Meanwhile, the processor may control the communicator to transmit the notification and a request for broadcasting the notification to a second external device among the one or more external devices, and the second external device may transmit a control signal corresponding to the notification to all the external devices other than the second external device among the one or more external devices based on the request.

Meanwhile, the notification may be transmitted to the one or more external devices at a predetermined period.

In accordance with another aspect of the disclosure, a controlling method of an electronic device is provided. The method includes receiving a call request of a caller from a server, identifying whether a recipient who is a user of the electronic device is in a call with another caller, identifying a first external device close to the electronic device among one or more external devices connected to the electronic device in case that it is identified that the recipient is in the call with the other caller, and transmitting identification information for the identified first external device and a response to the call request to the server to transmit the call request to the identified first external device.

Here, the identifying of the first external device may include identifying the first external device close to the electronic device among the one or more external devices based on information on a strength of a signal received from the one or more external devices through the communicator.

Meanwhile, the call request may be a call request for performing a call based on mission critical push to talk (MCPTT) technology, and the first external device may be a device capable of processing the call request based on the MCPTT technology.

Meanwhile, the method may further include starting a call session according to the call request in case that the call request is a call request for performing a call based on emergency MCPTT technology, and transmitting a notification indicating that the call session is started to one or more external devices among the identified one or more external devices in case that the response of the recipient to the call request is not received for a predetermined threshold time.

Here, the method may further include identifying a local network to which the electronic device is connected based on a position of the recipient, and identifying one or more external devices connected to the identified local network as the one or more external devices.

Here, the position of the recipient may be identified based on at least one of information on a position of the user received through a position information sensor included in the electronic device, information on strength of a signal received from the external device, or pre-stored network position information for the local network.

Meanwhile, the method may further include transmitting the notification and a request for broadcasting the notification to a second external device among the one or more external devices, wherein the second external device transmits a control signal corresponding to the notification to all the external devices other than the second external device among the one or more external devices based on the request.

Meanwhile, the notification may be transmitted to the one or more external devices at a predetermined period.

In accordance with another aspect of the disclosure, a non-transitory computer-readable recording medium is provided. The non-transitory computer-readable recording medium includes a program for executing a controlling method of an electronic device. The method includes receiving a call request of a caller from a server, identifying whether a recipient who is a user of the electronic device is in a call with another caller, identifying a first external device close to the electronic device among one or more external devices connected to the electronic device in case that it is identified that the recipient is in the call with the other caller, and transmitting identification information for the identified first external device and a response to the call request to the server to transmit the call request to the identified first external device.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

BEST MODE

Figure 1:
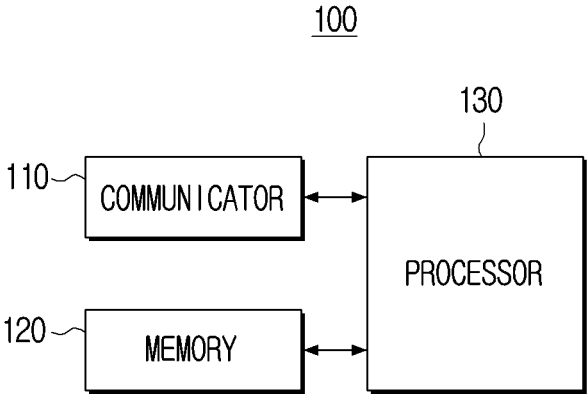
FIG. 1 is a diagram schematically showing a configuration of an electronic device according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the disclosure, in case that a detailed description for the known functions or configurations related to the disclosure is decided to unnecessarily obscure the gist of the disclosure, the detailed description thereof is omitted.

In addition, the following embodiments may be modified in several different forms, and the scope and spirit of the disclosure are not limited to the following embodiments. Rather, these embodiments are provided to make the disclosure thorough and complete, and to completely transfer the spirit of the disclosure to those skilled in the art.

Terms used in the disclosure are used only to describe the specific embodiments rather than limiting the scope of the disclosure. Terms of a singular form may include plural forms unless explicitly indicated otherwise.

In the disclosure, an expression "have," "may have," "include," "may include" or the like, indicates existence of a corresponding feature (for example, a numerical value, a function, an operation or a component such as a part), and does not exclude existence of an additional feature.

In the disclosure, expressions "A or B," "least one of A and/or B," "one or more of A and/or B" and the like, may include all possible combinations of items enumerated together. For example, "A or B," "at least one of A and B" or "at least one of A or B" may indicate all of 1) a case where at least one A is included, 2) a case where at least one B is included or 3) a case where both of at least one A and at least one B are included.

Expressions "first," "second" and the like, used in the disclosure may indicate various components regardless of a sequence and/or importance of the components. These expressions are only used in order to distinguish one component from the other components, and do not limit the corresponding components.

In case that any component (for example, a first component) is mentioned to be "(operatively or communicatively) coupled with/to" or "connected to" another component (for example, a second component), it is to be understood that the any component is directly coupled to the other component or may be coupled to the other component through other component (for example, a third component).

On the other hand, in case that any component (for example, the first component) is mentioned to be "directly coupled to" or "directly connected to" another component (for example, the second component), it is to be understood that other component (for example, the third component) is not present between any component and another component.

An expression "configured (or set) to" used in the disclosure may be replaced by an expression "suitable for," "having the capacity to," "designed to," "adapted to," "made to" or "capable of" based on a situation. The expression "configured (or set) to" may not necessarily indicate "specifically designed to" in hardware.

Instead, an expression "an apparatus configured to" may indicate that the apparatus may "perform~" together with other apparatuses or components. For example, "a processor configured (or set) to perform A, B and C" may indicate a dedicated processor (for example, an embedded processor) for performing the corresponding operations or a generic-purpose processor (for example, a central processing unit (CPU) or an application processor) that may perform the corresponding operations by executing one or more software programs stored in a memory apparatus.

In the embodiments, a "module" or a "~er/or" may perform at least one function or operation, and be implemented by hardware or software, or be implemented by a combination of hardware and software. In addition, a plurality of "modules" or a plurality of "~ers/ors" may be integrated in at least one module and be implemented by at least one processor except for a "module" or an "~er/or" that needs to be implemented by specific hardware.

Meanwhile, various elements and regions in the drawings are schematically illustrated. Therefore, the spirit of the disclosure is not limited by relative sizes or intervals illustrated in the accompanying drawings.

Hereinafter, the embodiments of the disclosure are described in detail with reference to the accompanying drawings so that those skilled in the art to which the disclosure pertains may easily practice the disclosure.

FIG. 1 is a diagram schematically showing a configuration of an electronic device 100 according to an embodiment of the disclosure.

The electronic device 100 according to the disclosure refers to a device of a recipient that is capable of performing a call with a caller. In detail, the electronic device 100 may receive a call request of the caller from a server, start a call session with the caller based on transmitting the received call request to the server, and then perform the call with the caller. In the disclosure, the server refers to a device that relays various data/information/signals for the call between the caller and the recipient between the device of the caller and a device of the recipient.

As described above in the Description of the Related Art, the call request according to the disclosure may be a call request for performing a call based on mission critical push to talk (MCPTT) technology. In detail, the call request according to the disclosure may be a general MCPTT call request, or may be an emergency MCPTT call request for performing a high-priority MCPTT call.

In case that the general MCPTT call request is received, the recipient may be in a call with another caller and priority of the current call may be higher than priority of the received call request. Here, the received call request may be ignored and accordingly, the call may not be performed between the caller and the recipient. Meanwhile, in case that the emergency MCPTT call request is received, the recipient may not be in vicinity of the electronic device 100. Here, the recipient may not respond to a message of the caller, and accordingly, the call may not be performed between the caller and the recipient. Hereinafter, the description describes various embodiments of the disclosure for solving the above-described problems.

Referring to FIG. 1, the electronic device 100 according to an embodiment of the disclosure may include a communicator 110, a memory 120 and a processor 130.

The communicator 110 may include a circuit, and may communicate with the server or an external device. In detail, the processor 130 may allow various data or information to be received from the server or the external device, connected through the communicator 110, and allow the various data or information to be transmitted to the server or the external device.

The communicator 110 may include at least one of a Wi-Fi module, a Bluetooth module, a wireless communication module, a near field communication (NFC) module or an ultra wide band (UWB) module. In detail, the Wi-Fi module and the Bluetooth module may respectively perform the communication by using a Wi-Fi method and a Bluetooth method. In case of using the Wi-Fi module or the Bluetooth module, the communicator 110 may first transmit and receive various connection information such as a service set identifier (SSID), connect the communication by using this connection information, and then transmit and receive various information.

In addition, the wireless communication module may perform the communication based on various communication protocols such as institute of electrical and electronics engineers (IEEE), zigbee, 3rd generation (3G), 3rd generation partnership project (3GPP), long term evolution (LTE), 5th Generation (5G), etc. In addition, the NFC module may perform the communication by using an NFC method that uses a 13.56 MHz band among various radio frequency identification (RF-ID) frequency bands such as 135 kHz, 13.56 MHz, 433 MHz, 860 to 960 MHz and 2.45 GHz. In addition, the UWB module may accurately measure time of arrival (ToA), which is time at which a pulse reaches a target, and an angle of arrival (AoA), which is the angle of arrival of a pulse at a transmission device, through the communication between UWB antennas, and may thus perform accurate distance and position recognition within an error range of several tens of centimeters (cm) indoors.

In particular, in the various embodiments according to the disclosure, the communicator 110 may receive the call request of the caller from the server, and may transmit a response to the call request to the server. The communicator 110 may also transmit identification information for the external device to the server.

In addition, the communicator 110 may transmit/receive audio data and/or image data for the call after the call session is started between the caller and the recipient. In particular, the communicator 110 may enable the call with the caller by transmitting the audio data and/or the image data for the call with the caller to the external device and receiving the audio data and/or the image data from the external device.

The memory 120 may store at least one instruction related to the electronic device 100. In addition, the memory 120 may store an operating system (O/S) for driving the electronic device 100. In addition, the memory 120 may store various software programs or applications for operating the electronic device 100 according to the various embodiments of the disclosure. In addition, the memory 120 may include a semiconductor memory such as a flash memory, or a magnetic storing medium such as a hard disk, or the like.

In detail, the memory 120 may store various software modules for operating the electronic device 100 according to the various embodiments of the disclosure, and the processor 130 may allow the various software modules stored in the memory 120 to be executed to control an operation of the electronic device 100. That is, the memory 120 may be accessed by the processor 130, and readout, recording, correction, deletion, update and the like of data may be performed by the processor 130.

Meanwhile, in the disclosure, the term "memory 120" may include the memory 120, a read only memory (ROM, not shown) or a random access memory (RAM, not shown), in the processor 130, or a memory card (not shown, and for example, a micro secure digital (SD) card or a memory stick) mounted on the electronic device 100.

In particular, in the various embodiments according to the disclosure, the memory 120 may store the call request of the caller, the response to the call request, the identification information for the external device, the audio data for the call with the caller, the image data for the call with the caller, etc. In addition, the memory 120 may store data for an algorithm for processing the MCPTT call request according to the disclosure.

In addition, the memory 120 may store various information necessary within a scope to achieve the purpose of the disclosure, and the information stored in the memory 120 may be received from the server or the external device, or input by a user to be updated.

The processor 130 may control an overall operation of the electronic device 100. In detail, the processor 130 may be connected to the components of the electronic device 100 such as the communicator 110 and the memory 120 as described above, and control the overall operation of the electronic device 100 by allowing at least one instruction stored in the memory 120 as described above to be executed.

The processor 130 may be implemented in various schemes. For example, the processor 130 may be implemented as at least one of an application specific integrated circuit (ASIC), an embedded processor, a microprocessor, a hardware control logic, a hardware finite state machine (FSM) or a digital signal processor (DSP). Meanwhile, in the disclosure, the term "processor" may be used to include a central processing unit (CPU), a graphic processing unit (GPU), a main processing unit (MPU) or the like.

In particular, in the various embodiments according to the disclosure, in case that it is difficult for the recipient to respond to the call request of the caller, the processor 130 may allow the call request to be transmitted to another external device of the recipient or allow a notification to be provided for the recipient of the call request.

In an embodiment, the processor 130 may identify whether the recipient who is a user of the electronic device 100 is in the call with another caller in case that the call request of the caller is received from the server through the communicator 110. Here, the call request may be the general MCPTT call request. In detail, the processor 130 may allow a session initiation protocol (SIP) invitation based on the MCPTT call request to be received from the server through the communicator 110. The processor 130 may then identify whether the recipient is in the call with another caller based on whether the call session is established between the electronic device 100 of the recipient and another electronic device 100 of the caller.

The processor 130 may identify a first external device close to the electronic device 100 among one or more external devices connected to the electronic device 100 in case that it is identified that the recipient is in the call with another caller.

In detail, the processor 130 may identify one or more external devices connected to the electronic device 100 by using various communication methods. For example, in case that the electronic device 100 is a smartphone of the recipient, the processor 130 may use the Bluetooth method to identify one or more external devices such as a smart watch and a tablet personal computer (PC), which are paired with the smartphone.

In case that one or more external devices connected to the electronic device 100 are identified, the processor 130 may identify the first external device close to the electronic device 100 among one or more external devices connected to the electronic device 100 based on a distance between the electronic device 100 and one or more external devices. In detail, the processor 130 may identify an external device whose distance from the electronic device 100 is less than a predetermined threshold distance as the first external device. In addition, there may be two or more external devices whose distance from the electronic device 100 is less than the predetermined threshold distance among one or more external devices connected to the electronic device 100. In this case, the processor 130 may identify an external device having the closest distance to the electronic device 100 as the first external device.

For example, the processor 130 may identify the first external device close to the electronic device 100 among one or more external devices based on information (i.e., received signal strength indicator (RSSI) information) on strength of a signal received from one or more external devices through the communicator 110. In addition, various techniques for measuring proximity between devices, such as a technique using global positioning system (GPS) information, may be used in a process of identifying the first external device.

Meanwhile, in the disclosure, the first external device refers to a device capable of processing the call request based on the MCPTT technology. That is, the processor 130 may identify external devices which may process the call request based on the MCPTT technology among one or more external devices connected to the electronic device 100, and identify the first external device close to the electronic device 100 among the identified external devices.

In case that the first external device is identified, the processor 130 may control the communicator 110 to transmit the identification information for the first external device and the response to the call request to the server to transmit the call request to the first external device.

In the disclosure, the term "identification information" is used as a generic term for information useful for providing the call session for the first external device, including subscriber identity module (SIM) information. The identification information for the first external device may be obtained by identifying the first external device and then requesting the identification information from the first external device, or may be obtained while the electronic device 100 and the first external device are paired with each other, and pre-stored in the memory 120.

In detail, the processor 130 may control the communicator 110 to transmit the identification information for the first external device to the server together with the response to the call request. Here, the response to the call request may include a busy code indicating that the current recipient is in the call with another caller. In case that the identification information for the first external device and the response to the call request are transmitted to the server, the server may redirect the call request of the caller to the first external device based on the identification information for the first external device. Accordingly, the recipient of the electronic device 100 may perform the call with the caller through the first external device.

Meanwhile, the description above describes that the first external device is the device capable of processing the call request based on the MCPTT technology, and thus describes that the server redirects the call request to the first external device on a premise that the first external device includes an audio input (e.g., microphone) and an audio output (e.g., speaker). However, one or more external devices connected to the electronic device 100 may include no external device including the audio input and the audio output. In this case, the server may transmit, to one or more external devices, a notification indicating that the call request is received rather than the call request. In addition, the first external device close to the electronic device 100 may not include at least one of the audio input or the audio output. In this case, the server may also transmit, to the first external device, the notification indicating that the call request is received rather than the call request.

Meanwhile, an embodiment described above is provided on the premise that the call request according to the disclosure is the general MCPTT call request. However, the call request according to the disclosure may be the emergency MCPTT call request. Hereinafter, the description describes an embodiment in which the call request is the emergency MCPTT call request.

In an embodiment, the processor 130 may allow the call session according to the call request to be started regardless of whether the recipient is in the call with another caller in case that the call request is the call request for performing the call based on the emergency MCPTT technology. In other words, in case that the recipient is in the call with another caller, the processor 130 may allow the current call to be ended and the call session according to the received call request to be started.

The call session according to the emergency MCPTT call request may be started between the recipient and the caller, and the response of the recipient to the call request may then be received for the predetermined threshold time. In this case, the call may be made between the recipient and the caller.

On the other hand, the processor 130 may control the communicator 110 to transmit a notification indicating that the call session is started to one or more external devices among the identified one or more external devices in case that the response of the recipient to the call request is not received for the predetermined threshold time.

In detail, the processor 130 may identify a local network to which the electronic device 100 is connected based on position of the recipient, and control the communicator 110 to transmit the notification indicating that the call session is started to one or more external devices connected to the identified local network. Here, the position of the recipient may be identified based on at least one of information on position of the user received through a position information sensor included in the electronic device 100, information on the strength of the signal received from the external device through the communicator 110, or pre-stored network position information for the local network.

For example, in case that the electronic device 100 includes the position information sensor such as a global positioning system (GPS) sensor, the processor 130 may obtain information on the position of the recipient based on the position information obtained through the GPS sensor. In addition, the processor 130 may obtain the information on the position of the recipient based on information on strength of a Bluetooth beacon signal or strength of a Wi-Fi signal received from the plurality of external devices and information on the strength of the Bluetooth beacon signal or the strength of the Wi-Fi signal transmitted from the electronic device 100 to the plurality of external devices. In addition, the electronic device 100 may be connected to a network such as a local area network (LAN) or a wide area network (WAN), and the user may use this network for a home, an office or the like. In this case, the processor 130 may obtain the information on the position of the recipient based on predefined network position information.

Meanwhile, the processor 130 may transmit the notification indicating that the call session is started to one or more external devices connected to the local network. However, the processor 130 may transmit the notification indicating that the call session is started to a hub device among one or more external devices, and the hub device may thus transmit, to the rest external devices, the notification indicating that the call session is started or a control signal corresponding to the notification.

Here, the hub device refers to a device that transmits a signal, data, notification or the like for controlling another external device among one or more external devices connected to the local network. In detail, the hub device may be a device that performs communication with a plurality of devices by performing a central role of an Internet of things (IoT) environment in case that the IoT environment is built based on the plurality of external devices, and may be referred to by a term such as a smart hub, a gateway, a bridge, a controller, a coordinator or the like.

In detail, the processor 130 may control the communicator 110 to transmit the notification indicating that the call session is started and a request for broadcasting the notification to a second external device corresponding to the hub device. Accordingly, the second external device may transmit the notification indicating that the call session is started to all the external devices other than the second external device among one or more external devices based on the request for broadcasting the notification.

Meanwhile, the notification indicating that the call session is started may be transmitted to one or more external devices at a predetermined period. In addition, in case that there is no response from the recipient even by the threshold time, the processor 130 may end the call session between the caller and the recipient.

According to an embodiment described above, the electronic device 100 may transmit the call request to another external device of the recipient or provide the notification for the call request in case that it is difficult for the recipient to respond to the call request of the caller.

In particular, a purpose of the MCPTT is to support a client in all kinds of critical situations. According to the disclosure, the purpose of the MCPTT is to enable a group and a user, using the MCPTT technology, to quickly and effectively respond to an emergency by allowing the recipient to easily receive the MCPTT call, and increasing possibility of notifying the recipient that the emergency MCPTT call request is sent.

Meanwhile, the description above describes various examples of an embodiment according to the disclosure by taking the MCPTT communication system which is half duplex communication as an example. However, the various examples of the disclosure may be extended to a system using a simplex communication protocol or a duplex communication protocol.

In addition, the various examples of the disclosure may be applied in a variety of ways with intention of enabling the group whose purpose is to quickly and effectively respond to the emergency to make a decision based on an urgent situation and rapidly changed information.

Figure 2:
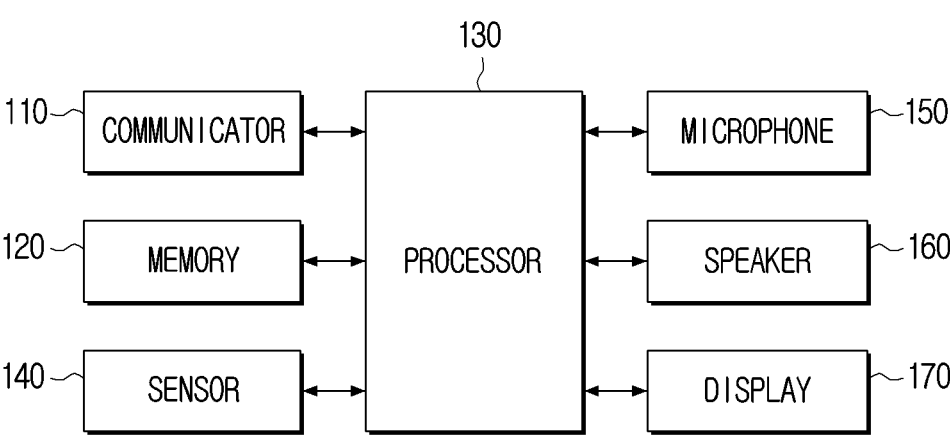
FIG. 2 is a block diagram showing a specific configuration of the electronic device according to an embodiment of the disclosure.

FIG. 2 is a block diagram showing a specific configuration of the electronic device 100 according to an embodiment of the disclosure.

Referring to FIG. 2, the electronic device 100 may further include a sensor 140, a microphone 150, a speaker 160 and a display 170 in addition to the communicator 110, the memory 120 and the processor 130.

The sensor 140 may detect various information inside and outside the electronic device 100. In particular, the sensor 140 according to the disclosure may be the global positioning system (GPS) sensor for obtaining the information on the position of the electronic device 100. In addition, the processor 130 may identify the first external device close to the electronic device 100 based on the position information obtained through the GPS sensor. The processor 130 may also identify the local network to which the electronic device 100 is connected based on the position information obtained through the GPS sensor.

The microphone 150 may obtain a signal for a sound or a voice, provided outside the electronic device 100. In detail, the microphone 150 may obtain vibration caused by the sound or the voice, provided outside the electronic device 100 and convert the obtained vibration into an electrical signal.

In an embodiment of the disclosure, the microphone 150 may obtain a voice signal for a user voice generated by utterance of the user (i.e., the recipient) of the electronic device 100. The obtained signal may then be converted into a digital signal and stored in the memory 120. The microphone 150 may include an analog to digital converter, and may be operated in conjunction with the A/D converter positioned outside the microphone 150.

The speaker 160 may output the audio data under control of the processor 130. In an embodiment of the disclosure, the speaker 160 may output a voice of the caller based on a voice signal generated by utterance of the caller.

The microphone 150 and the speaker 160 may respectively serve as an audio input for receiving the voice of the recipient and an audio output for outputting the voice of the caller to perform the call between the caller and the recipient according to the disclosure. However, even in case that the electronic device 100 does not include the microphone 150 or the speaker 160, it is also possible to perform the call between the caller and the recipient by transmitting and receiving the audio data to and from the external device through the communicator 110.

The display 170 may output the image data under the control of the processor 130. In detail, the display 170 may output an image pre-stored in the memory 120 under the control of the processor 130. In particular, the display 170 according to an embodiment of the disclosure may display a user interface stored in the memory 120.

The display 170 may be implemented as a liquid crystal display panel (LCD), an organic light emitting diode (OLED) or the like, and the display 170 may be implemented as a flexible display, a transparent display or the like in some cases. However, the display 170 according to the disclosure is not limited to a specific type.

In particular, the display 170 may display various information such as information indicating that the call request of the caller is received, information indicating that the call session with the caller is started, and information indicating that the call session with the caller is ended. In addition, in case that the call made between the caller and the recipient is a video call, the display 170 may output an image corresponding to the caller and/or an image corresponding to the recipient.

The description above describes the components of the electronic device 100 according to the disclosure with reference to FIGS. 1 and 2. However, such components are merely exemplary, and in implementing the disclosure, a new component may be added or some components may be omitted in addition to the components shown in FIGS. 1 and 2.

Figure 3:
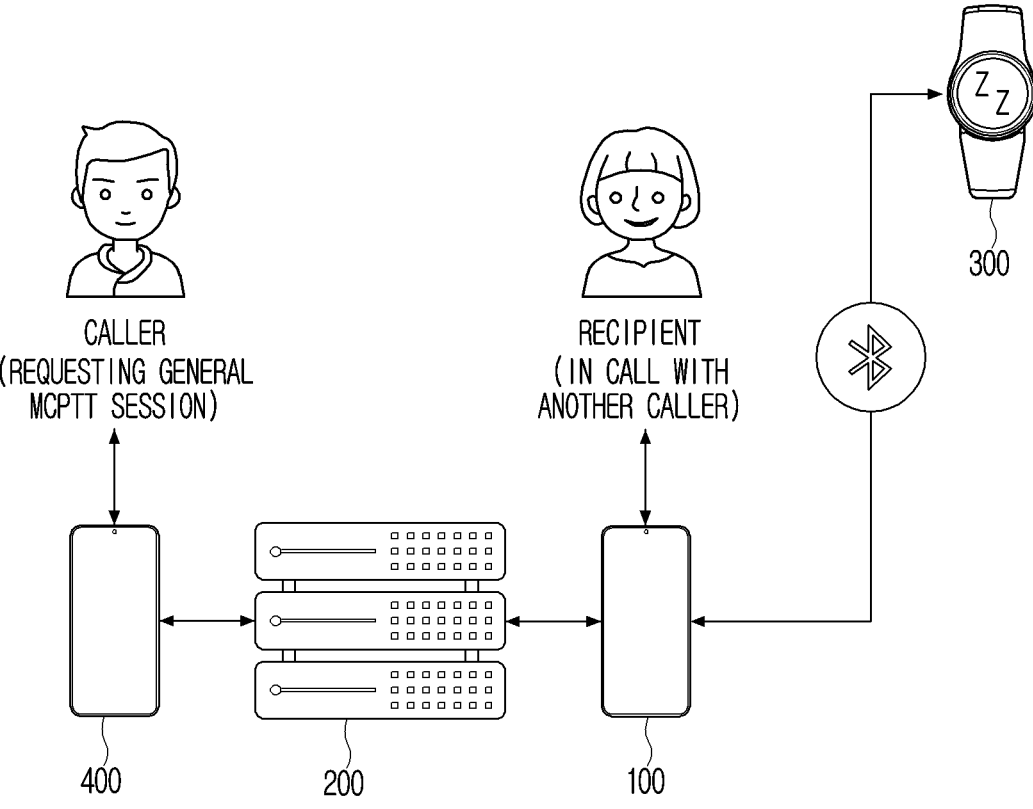
FIG. 3 is a diagram for explaining an embodiment of a case where a call request is a general mission critical push to talk (MCPTT) call request according to an embodiment of the disclosure.
Figure 4:
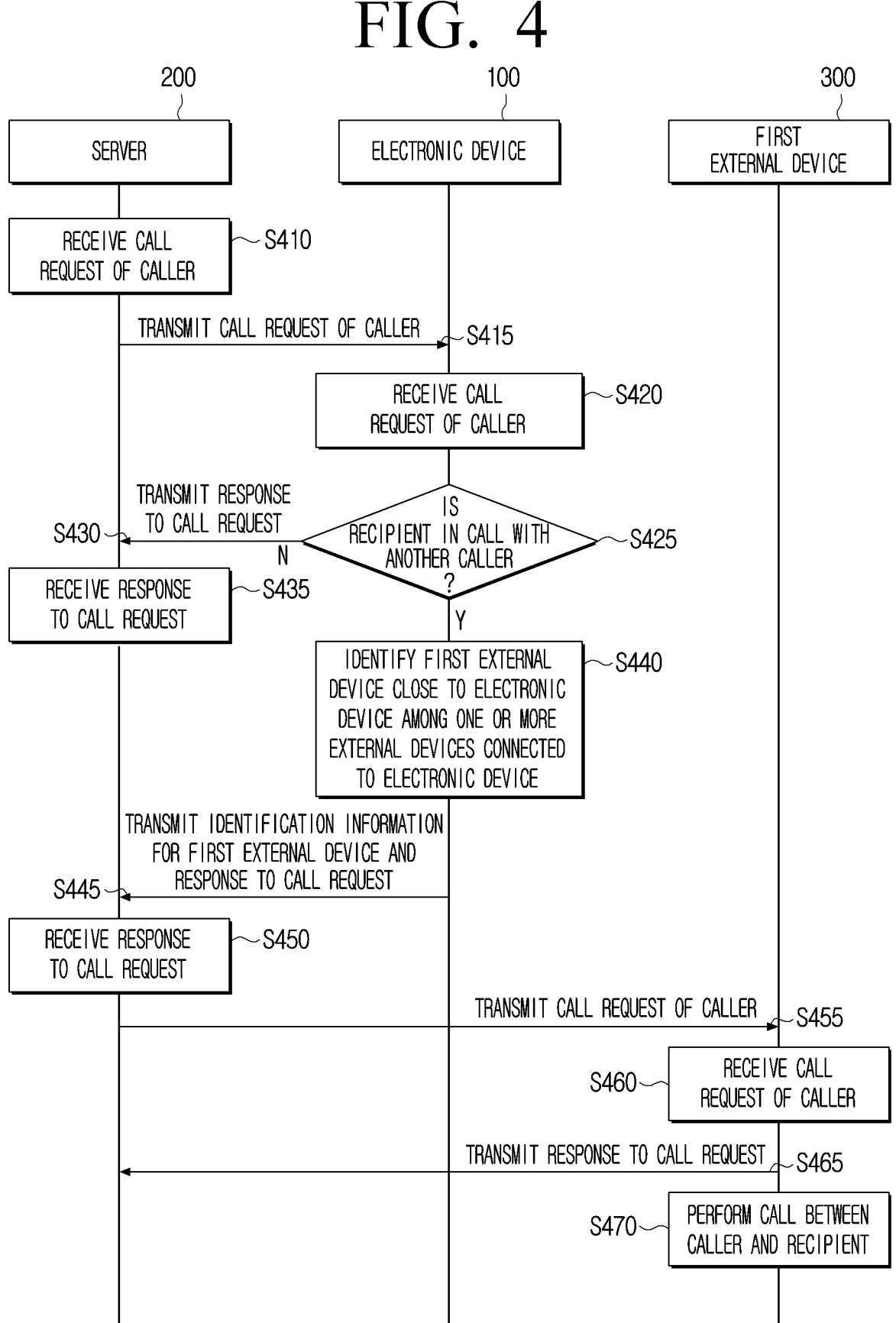
FIG. 4 is a sequence diagram for explaining an operation between a server, the electronic device and a first external device in case that the call request is the general MCPTT call request according to an embodiment of the disclosure.

FIG. 3 is a diagram for explaining an embodiment of a case where the call request is the general MCPTT call request according to an embodiment of the disclosure. FIG. 4 is a sequence diagram for explaining an operation between a server 200, the electronic device 100 and a first external device 300 in case that the call request is the general MCPTT call request according to an embodiment of the disclosure. Hereinafter, the description describes an embodiment related to a case where the general MCPTT call request is received in detail with reference to FIGS. 3 and 4.

Referring to FIG. 3, the caller may request a general MCPTT session from the server 200 by using a smartphone which is a caller terminal device 400, and accordingly, the server 200 may transmit a MCPTT session request of the caller to the smartphone which is the electronic device 100 of the recipient.

In this case, the recipient may be in the call with another caller by using the smartphone which is the electronic device 100 of the recipient, and the smartphone which is the electronic device 100 of the recipient and a smart watch which is the first external device 300 of the recipient may be paired with each other by the Bluetooth method. In the above state referring to FIG. 3, the electronic device 100, the server 200 and the first external device 300 according to the disclosure may perform the operation referring to FIG. 4.

Referring to FIG. 4, the server 200 may receive the call request of the caller at operation S410 and transmit the call request of the caller to the electronic device 100 at operation S415. Here, the call request of the caller refers to the call request based on the general MCPTT technology rather than the call request based on the emergency MCPTT technology.

The electronic device 100 may receive the call request of the caller at operation S420, and identify whether the recipient is in the call with another caller at operation S425. In detail, the electronic device 100 may identify whether the recipient is in the call with another caller based on whether the call session is established between electronic device 100 of the recipient and another electronic device 100 of the caller.

In case that the recipient is not in the call with another caller at operation S425—N, the electronic device 100 may transmit the response to the call request to the server 200 at operation S430, and the server 200 may receive the response to the call request at operation S435. In this case, although not shown in FIG. 4, the call may be made between the caller and the recipient by the relay of the server 200.

In case that the recipient is in the call with another caller at operation S425—Y, the electronic device 100 may identify the first external device 300 close to the electronic device 100 among one or more external devices connected to the electronic device 100 at operation S440. In detail, the electronic device 100 may identify one or more external devices connected to the electronic device 100 by using the various communication methods, and identify the first external device 300 close to the electronic device 100 among one or more external devices connected to the electronic device 100 based on the distance between the electronic device 100 and one or more external devices.

In case that the first external device 300 is identified, the electronic device 100 may transmit the identification information for the first external device 300 and the response to the call request at operation S445. Here, the identification information may be subscriber identity module (SIM) information for the first external device 300.

The server 200 may receive the response to the call request at operation S450, and transmit the call request of the caller to the first external device 300 at operation S455. In other words, the server 200 may redirect the call request of the caller to the first external device 300.

The first external device 300 may then receive the call request of the caller at operation S460, and transmit the response to the call request at operation S465 to perform the call between the caller and the recipient at operation S470. In case that the call is made between the caller and the recipient, the existing call session may be maintained or ended.

Meanwhile, an embodiment referring to FIG. 3 or 4 as described above may be applied in any of various scenarios. For example, a manager of paramedics may wish to make an emergency call with the paramedic. In this case, according to an embodiment referring to FIG. 3 or 4, the manager may make the emergency call with the paramedic by sending the call request to the external device such as a smart watch of the paramedic even in case that the paramedic is in the call with another caller by using his/her smartphone. Accordingly, the recipient may effectively respond to the emergency by quickly delivering a message about the emergency to the paramedic.

In addition to the paramedic, an embodiment referring to FIG. 3 or 4 may be similarly applied to a case where the recipient needs the quick response to the emergency, such as a firefighter, a police officer, a mine worker, or the like.

Figure 5:
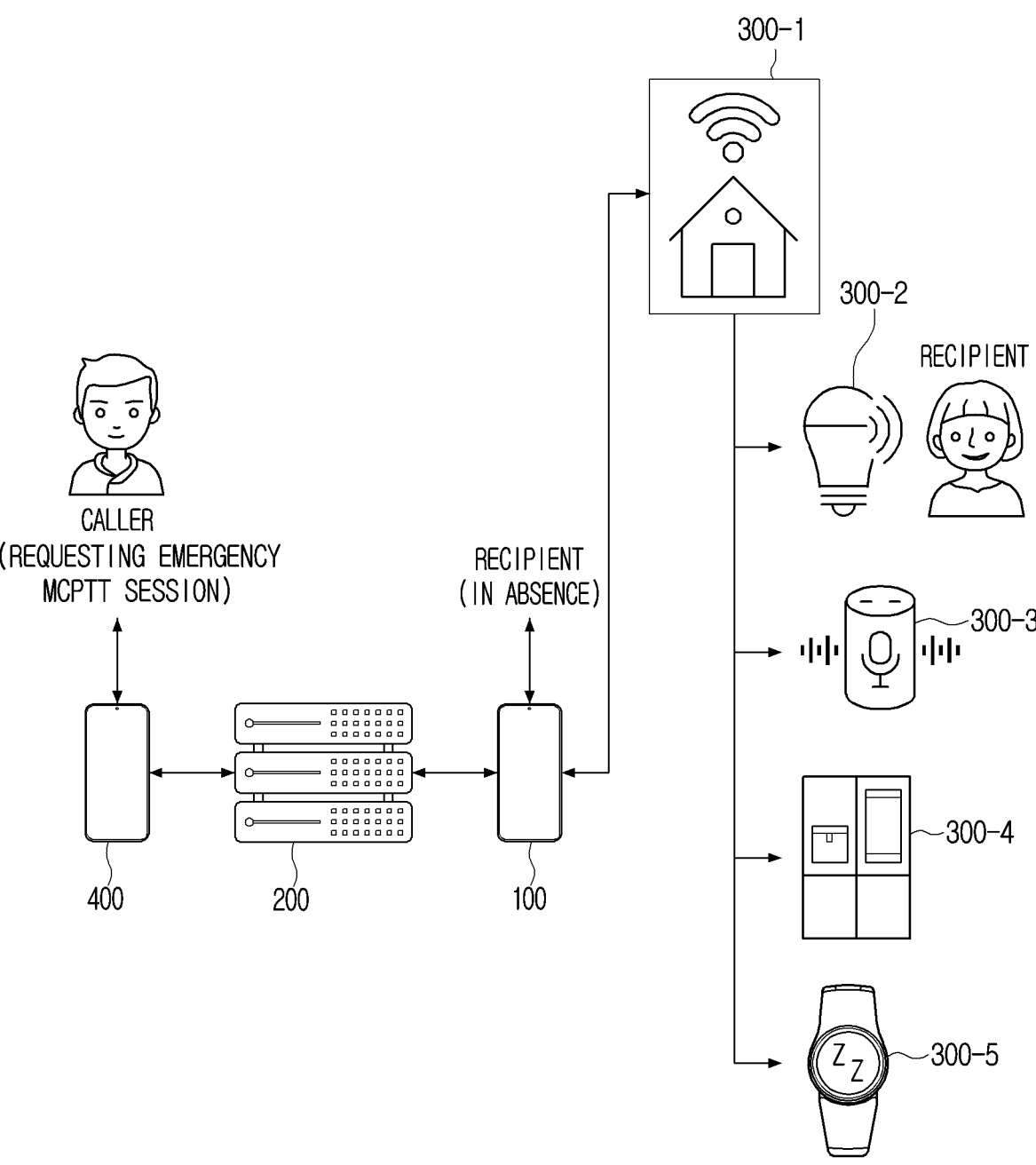
FIG. 5 is a diagram for explaining an embodiment of a case where the call request is an emergency MCPTT call request according to an embodiment of the disclosure.
Figure 6:
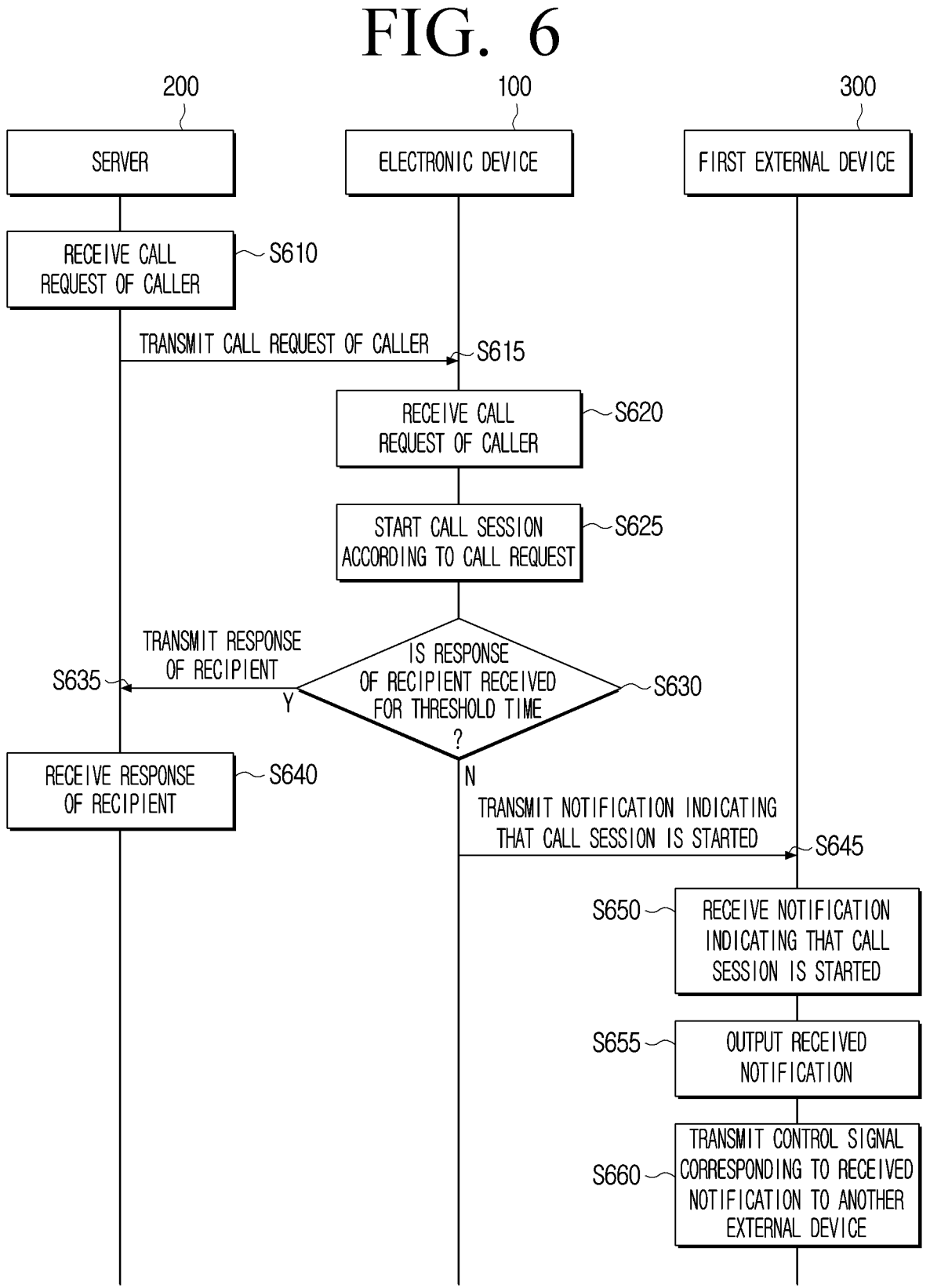
FIG. 6 is a sequence diagram for explaining an operation between the server, the electronic device and the first external device in case that the call request is the emergency MCPTT call request according to an embodiment of the disclosure.

FIG. 5 is a diagram for explaining an embodiment of a case where the call request is the emergency MCPTT call request according to an embodiment of the disclosure. FIG. 6 is a sequence diagram for explaining an operation between the server 200, the electronic device 100 and the first external device 300 in case that the call request is the emergency MCPTT call request according to an embodiment of the disclosure. Hereinafter, the description describes an embodiment related to a case where the emergency MCPTT call request is received in detail referring to FIGS. 5 and 6.

Referring to FIG. 5, the caller may request an emergency MCPTT session from the server 200 by using the smartphone which is the caller terminal device 400, and accordingly, the server 200 may transmit a MCPTT session request of the caller to the smartphone which is the electronic device 100 of the recipient.

Meanwhile, the smartphone which is the electronic device 100 of the recipient, and a hub device 300-1 positioned inside a house of the recipient may be connected with each other by the Wi-Fi method, and the hub device 300-1 may be connected to a light 300-2, a speaker device 300-3, a refrigerator 300-4 or a smart watch 300-5, positioned inside the house of the recipient by the Wi-Fi method. Unlike an embodiment referring to FIG. 5, the smartphone of the recipient may also be directly connected to all of the hub device 300-1, the light 300-2, the speaker device 300-3, the refrigerator 300-4 or the smart watch 300-5.

In this case, the recipient may not be positioned near the smartphone which is the electronic device 100 of the recipient. For example, the recipient may be in the house of the recipient, and positioned near the light rather than near the electronic device 100, i.e., smartphone. In the above state shown in FIG. 5, the electronic device 100, the server 200 and the plurality of external devices 300-1, 300-2, 300-3, 300-4 and 300-5 according to the disclosure may perform the operation as shown in FIG. 6.

Referring to FIG. 6, the server 200 may receive the call request of the caller at operation S610 and transmit the call request of the caller to the electronic device 100 at operation S615. Here, the call request of the caller refers to the call request based on the emergency MCPTT technology rather than the call request based on the general MCPTT technology.

The electronic device 100 may receive the call request of the caller at operation S620 and start the call session according to the call request at operation S625. In other words, in case that the recipient is in the call with another caller, the electronic device 100 may end the current call and start the call session according to the received call request.

In case that the response of the recipient to the call request is received for the predetermined threshold time at operation S630-Y after the call session is started between the recipient and the caller according to the emergency MCPTT call request, the electronic device 100 may transmit the response of the recipient to the server 200 at operation S635, and the server 200 may receive the response of the recipient at operation S640. In this case, the server 200 may relay the call between the caller and the recipient of the external device of the caller based on the response of the recipient.

In case that the response of the recipient to the call request is not received for the predetermined threshold time at operation S630-N after the call session is started between the recipient and the caller according to the emergency MCPTT call request, the server 200 may transmit the notification indicating that the call session is started to the first external device 300 at operation S645. Accordingly, the first external device 300 may receive the notification indicating that the call session is started from the server 200 at operation S650. In addition, the first external device 300 may not only output the received notification at operation S655, but also transmit the control signal corresponding to the received notification to another external device for another external device to output the received notification at operation S660. In particular, the notification indicating that the call session is started may be transmitted to one or more external devices at the predetermined period.

The hub device 300-1 may be a device that performs communication with a plurality of devices by performing a central role of an Internet of things (IOT) environment in case that the IoT environment is built based on the plurality of external devices. For example, the hub device 300-1 may be a television (TV) of the recipient.

In case that the control signal is received from the hub device 300-1, the light 300-2 may change its on/off state several times and blink or flash to provide the recipient with the notification indicating that the call session is started. In addition, the light 300-2 may change color of light emitted by the light 300-2 to provide the recipient with the notification indicating that the call session is started.

In case that the control signal is received from the hub device 300-1, the speaker device 300-3 may output a voice indicating that the call session is started. In detail, the speaker device 300-3 may output the voice indicating that the call session is started until the call is made between the caller and the recipient based on the response of the recipient to the call request, or the call session is ended between the caller and the recipient because there is no response of the recipient until the threshold time.

In case that the control signal is received from the hub device 300-1, the refrigerator 300-4 may provide the notification indicating that the call session is started through a display of the refrigerator. In addition, the refrigerator 300-4 may blink or flash the display several times or change color of information displayed on the display to provide the recipient with the notification indicating that the call session is started. In addition, in case that the refrigerator 300-4 includes a speaker, the refrigerator 300-4 may output a voice indicating that the call session is started.

In case that the control signal is received from the hub device 300-1, the smart watch 300-5 may change its on/off state several times and blink or flash to provide the notification indicating that the call session is started. In addition, the smart watch 300-5 may prompt a user respond by providing haptic vibration, outputting a voice through a speaker, providing the notification through a display, or the like.

Meanwhile, the smartphone which is the electronic device 100 of the recipient may function as the hub device for the plurality of external devices 300-1, 300-2, 300-3, 300-4 and 300-5. In this case, the electronic device may directly transmit the notification indicating that the call session is started or the control signal corresponding to the notification to the plurality of external devices 300-1, 300-2, 300-3, 300-4 and 300-5.

An embodiment shown in FIG. 5 or 6 as described above may be applied in any of various scenarios. For example, the police officer, the firefighter, or the paramedic may not be on duty or may be in sleep. In this case, according to an embodiment shown in FIG. 5 or 6, the call request or notification to notify the emergency may be provided to the various devices around the police officer, the firefighter or the paramedic, thereby allowing these crews to effectively respond to the emergency.

For another example, an elderly person may wish to make an emergency call to a predetermined guardian. In this case, according to an embodiment of FIG. 5 or 6, the call request or notification for an emergency rescue may be provided to various devices around the predetermined guardian, and the guardian may quickly respond to the emergency call from the elderly person.

Figure 7:
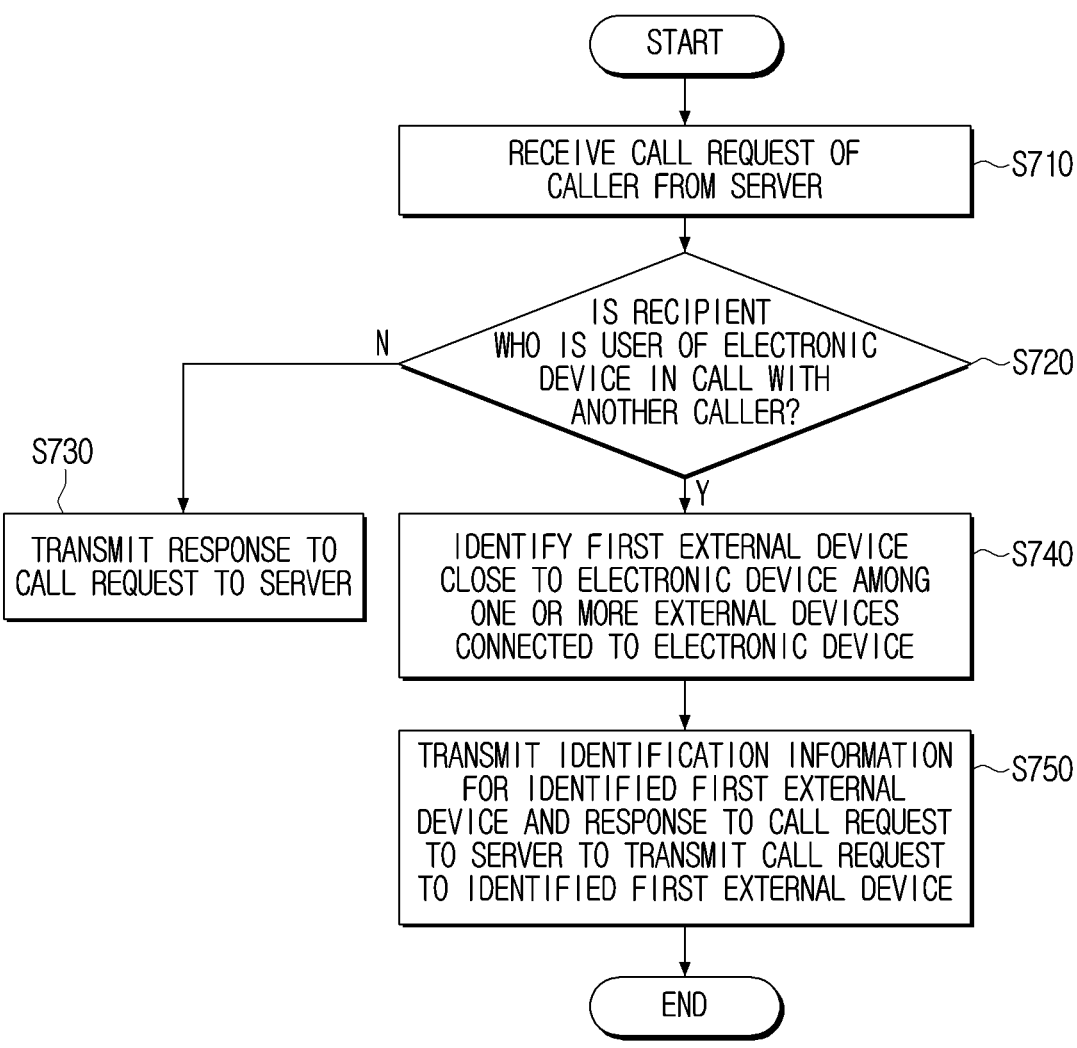
FIG. 7 is a flowchart showing a controlling method of an electronic device according to an embodiment of the disclosure.

FIG. 7 is a flowchart showing a controlling method of an electronic device 100 according to an embodiment of the disclosure.

Referring to FIG. 7, the electronic device 100 may receive a call request of a caller from a server at operation S710. Here, the call request of the caller may be a general MCPTT call request.

In case that the call request of the caller is received, the electronic device 100 may identify whether the recipient who is a user of the electronic device 100 is in the call with another caller at operation S720.

The electronic device 100 may transmit a response to the call request to the server at operation S730 in case that it is identified that the recipient is not in the call with another caller at operation S720-N, and a call may be made between the caller and the recipient based thereon.

The electronic device 100 may identify a first external device 300 close to the electronic device 100 among one or more external devices connected to the electronic device 100 at operation S740 in case that it is identified that the recipient is in the call with another caller at operation S720-Y. In detail, the processor may identify one or more external devices connected to the electronic device 100 by using various communication methods. In case that one or more external devices connected to the electronic device 100 are identified, the processor may identify the first external device close to the electronic device 100 among one or more external devices connected to the electronic device 100 based on a distance between the electronic device 100 and one or more external devices.

In case that the first external device is identified, the electronic device 100 may transmit identification information for the first external device and the response to the call request to the server to transmit the call request to the first external device at operation S750. Here, the term "identification information" may be used to indicate subscriber identity module (SIM) information.

In case that the identification information for the first external device and the response to the call request are transmitted to the server, the server may redirect the call request of the caller to the first external device based on the identification information for the first external device. Accordingly, the recipient of the electronic device 100 may perform the call with the caller through the first external device.

Meanwhile, the call request of the caller may be an emergency MCPTT call request. In addition, in case that the call request is the call request for performing the call based on the emergency MCPTT technology, the electronic device 100 may start a call session according to the call request regardless of whether the recipient is in the call with another caller.

The call session according to the emergency MCPTT call request may be started between the recipient and the caller, and the response of the recipient to the call request may then be received for a predetermined threshold time. In this case, the call may be made between the recipient and the caller.

On the other hand, the response of the recipient to the call request may not be received for the predetermined threshold time. In this case, the electronic device 100 may control the communicator to transmit a notification indicating that the call session is started to one or more external devices among the identified one or more external devices.

In detail, the electronic device 100 may identify a local network to which the electronic device 100 is connected based on position of the recipient, and transmit the notification indicating that the call session is started to one or more external devices connected to the identified local network.

Meanwhile, the electronic device 100 may transmit the notification indicating that the call session is started to a hub device among one or more external devices, and the hub device may thus transmit, to the rest external devices, the notification indicating that the call session is started or a control signal corresponding to the notification.

Meanwhile, the controlling method of an electronic device 100 according to another embodiment as described above may be implemented as a program and provided to the electronic device 100. In particular, the program including the controlling method of an electronic device 100 may be stored and provided in a non-transitory computer readable medium.

In detail, in the non-transitory computer-readable recording medium that includes the program for executing the controlling method of an electronic device 100, the controlling method of an electronic device 100 includes: receiving a call request of a caller from a server; identifying whether a recipient who is a user of the electronic device 100 is in a call with another caller; identifying a first external device close to the electronic device 100 among one or more external devices connected to the electronic device 100 in case that it is identified that the recipient is in the call with another caller; and transmitting the identified identification information for the first external device and a response to the call request to the server to transmit the call request to the identified first external device.

The description above briefly describes the controlling method of an electronic device 100 and the computer-readable recording medium including the program for executing the controlling method of an electronic device 100. However, this description is provided only for omitting a redundant description, and the various examples of the electronic device 100 may also be applied to the controlling method of an electronic device 100 and the computer-readable recording medium including the program for executing the controlling method of an electronic device 100.

A machine-readable storage medium may be provided in the form of a non-transitory storage medium. Here, the "non-transitory storage medium" may refer to a tangible device and only indicate that this storage medium does not include a signal (e.g., electromagnetic wave), and this term does not distinguish a case where data is stored semi-permanently in the storage medium and a case where data is temporarily stored in the storage medium from each other. For example, the "non-transitory storage medium" may include a buffer in which data is temporarily stored.

The method according to the various examples of another embodiment disclosed in the disclosure may be included and provided in a computer program product. The computer program product may be traded as a product between a seller and a purchaser. The computer program product may be distributed in a form of the storage medium (for example, a compact disc read only memory (CD-ROM)) that may be read by a machine, or may be distributed online (for example, downloaded or uploaded) through an application store (for example, PlayStore™) or directly between two user devices (for example, smartphones). In case of the online distribution, at least a portion of the computer program product (e.g., downloadable app) may be at least temporarily stored in the machine-readable storage medium such as a memory of a server of a manufacturer, a server of an application store or a relay server, or be temporarily provided.

Each of components (for example, modules or programs) according to the various embodiments of the disclosure described above may include a single entity or a plurality of entities, and some of the corresponding sub-components described above may be omitted or other sub-components may be further included in the various embodiments. Alternatively or additionally, some of the components (for example, the modules or the programs) may be integrated into one entity, and may perform functions performed by the respective corresponding components before being integrated in the same or similar manner.

Operations performed by the modules, the programs or other components according to the various embodiments may be executed in a sequential manner, a parallel manner, an iterative manner or a heuristic manner, at least some of the operations may be performed in a different order or be omitted, or other operations may be added.

Meanwhile, the term "part" or "module" used in the disclosure may include a unit including hardware, software or firmware, and may be used interchangeably with the term, for example, a logic, a logic block, a component or a circuit. The "part" or "module" may be an integrally formed component, or a minimum unit or part performing one or more functions. For example, the module may include an application-specific integrated circuit (ASIC).

The various embodiments of the disclosure may be implemented by software including an instruction stored in the machine-readable storage medium (for example, the computer-readable storage medium). The machine may be an apparatus that invokes the stored instruction from the storage medium, may be operated based on the invoked instruction, and may include the electronic device (for example, electronic device 100) according to the disclosed embodiments.

In case that the instruction is executed by the processor, the processor may directly perform a function corresponding to the instruction or other components may perform the function corresponding to the instruction under a control of the processor. The instruction may include codes provided or executed by a compiler or an interpreter.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   communication circuitry;
   memory storing at least one instruction; and
   one or more processors communicatively coupled to the communication circuitry and the memory,
   wherein the at least one instruction, when executed by the one or more processors individually or collectively, cause the electronic device to:
      identify a type of a call request, in case that the call request of a caller is received from a server through the communication circuitry,
      based on the type of the call request being a first type, control the communication circuitry to transmit, to at least one external device among one or more external devices connected to the electronic device, a notification indicating that a call session is started, based on the type of the call request being a second type, identify whether a recipient who is a user of the electronic device is in a call with another caller by allowing the at least one instruction to be executed,
      identify a first external device close to the electronic device among the one or more external devices connected to the electronic device in case that it is identified that the recipient is in the call with the other caller, and
      control the communication circuitry to transmit identification information for the identified first external device and a response to the call request to the server to transmit the call request to the identified first external device.

2. The electronic device of claim 1, wherein the at least one instruction, when executed by the one or more processors individually or collectively, further cause the electronic device to identify the first external device close to the electronic device among the one or more external devices based on information on a strength of a signal received from the one or more external devices through the communication circuitry.

3. The electronic device of claim 1,
   wherein the call request is a call request for performing a call based on mission critical push to talk (MCPTT) technology, and
   wherein the first external device is a device capable of processing the call request based on the MCPTT technology.

4. The electronic device of claim 3, wherein the at least one instruction, when executed by the one or more processors individually or collectively, further cause the electronic device to:
   allow a session initiation protocol (SIP) invitation based on the MCPTT call request to be received from the server through the communication circuitry, and
   identify whether the recipient is in the call with the other caller based on whether a call session is established between the electronic device and another electronic device of the other caller.

5. The electronic device of claim 1, wherein the at least one instruction, when executed by the one or more processors individually or collectively, further cause the electronic device to:
   identify a local network to which the electronic device is connected based on a position of the recipient, and
   identify one or more external devices connected to the identified local network as the one or more external devices.

6. The electronic device of claim 5, wherein the position of the recipient is identified based on at least one of:
   information on a position of the user received through a position information sensor included in the electronic device,
   information on a strength of a signal received from the first external device through the communication circuitry, or
   pre-stored network position information for the local network.

7. The electronic device of claim 1,
   wherein the at least one instruction, when executed by the one or more processors individually or collectively, further cause the electronic device to control the communication circuitry to transmit the notification and a request for broadcasting the notification to a second external device among the one or more external devices, and wherein the second external device transmits a control signal corresponding to the notification to all the external devices other than the second external device among the one or more external devices based on the request.

8. The electronic device of claim 7, wherein the notification is transmitted to the one or more external devices at a predetermined period.

9. The electronic device of claim 7, wherein the one or more external devices change an on/off state, blink, output a voice, change color of information displayed, provide a notification through a display, or provide haptic vibration in response to the control signal.

10. The electronic device of claim 7, wherein the second external device is a hub device.

11. The electronic device of claim 1, wherein the server redirects the call request of the caller to the first external device based on the identification information for the first external device.

12. The electronic device of claim 1, wherein the identification information is subscriber identity module (SIM) information for the first external device.

13. A controlling method of an electronic device, the method comprising:

receiving a call request of a caller from a server;

identifying a type of the call request;

based on the type of the call request being a first type, transmitting, to at least one external device among one or more external devices connected to the electronic device, a notification indicating that a call session is started;

based on the type of the call request being a second type, identifying whether a recipient who is a user of the electronic device is in a call with another caller;

identifying a first external device close to the electronic device among one or more external devices connected to the electronic device in case that it is identified that the recipient is in the call with the other caller; and transmitting identification information for the identified first external device and a response to the call request to the server to transmit the call request to the identified first external device.

14. The method of claim 13, wherein the identifying of the first external device includes identifying the first external device close to the electronic device among the one or more external devices based on information on a strength of a signal received from the one or more external devices through communication circuitry.

15. The method of claim 13, wherein the call request is a call request for performing a call based on mission critical push to talk (MCPTT) technology, and wherein the first external device is a device capable of processing the call request based on the MCPTT technology.

16. The method of claim 13, further comprising:

starting a call session according to the call request in case that the call request is a call request for performing a call based on emergency mission critical push to talk (MCPTT) technology; and transmitting a notification indicating that the call session is started to one or more external devices among the identified one or more external devices in case that the response of the recipient to the call request is not received for a predetermined threshold time.

17. The method of claim 16, further comprising:

identifying a local network to which the electronic device is connected based on a position of the recipient; and identifying one or more external devices connected to the identified local network as the one or more external devices.

18. The method of claim 17, wherein the position of the recipient is identified based on at least one of:

information on a position of the user received through a position information sensor included in the electronic device, information on a strength of a signal received from the first external device, or pre-stored network position information for the local network.

19. The method of claim 16, further comprising transmitting the notification and a request for broadcasting the notification to a second external device among the one or more external devices, wherein the second external device transmits a control signal corresponding to the notification to all the external devices other than the second external device among the one or more external devices based on the request.

20. The electronic device of claim 1, wherein upon identifying the first external device, request the identification information from the first external device.

* * * * *